(12) United States Patent
Iguchi

(10) Patent No.: US 7,111,192 B2
(45) Date of Patent: Sep. 19, 2006

(54) METHOD FOR OPERATING STORAGE SYSTEM INCLUDING A MAIN SITE AND A BACKUP

(75) Inventor: Hiroaki Iguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 191 days.

(21) Appl. No.: 10/859,341

(22) Filed: Jun. 3, 2004

(65) Prior Publication Data

US 2005/0210314 A1  Sep. 22, 2005

(30) Foreign Application Priority Data

Mar. 17, 2004  (JP) .............................. 2004-076356

(51) Int. Cl.
*G06F 11/00* (2006.01)
(52) U.S. Cl. .................... 714/6; 714/7; 714/5
(58) Field of Classification Search ................. 714/2–7
See application file for complete search history.

(56) References Cited

U.S. PATENT DOCUMENTS

| | | | |
|---|---|---|---|
| 5,404,508 A * | 4/1995 | Konrad et al. .............. | 707/202 |
| 5,673,382 A | 9/1997 | Cannon et al. | |
| 5,832,222 A | 11/1998 | Dziadosz et al. | |
| 6,389,552 B1 | 5/2002 | Hamilton et al. | |
| 6,697,960 B1 | 2/2004 | Clark et al. | |
| 6,766,430 B1 * | 7/2004 | Arakawa et al. ............. | 711/165 |
| 2001/0049800 A1 | 12/2001 | Suzuki et al. | |
| 2005/0144500 A1 * | 6/2005 | Inoue et al. .................... | 714/2 |

FOREIGN PATENT DOCUMENTS

JP  2002-7304  1/2002

* cited by examiner

*Primary Examiner*—Scott Baderman
*Assistant Examiner*—Timothy M. Bonura
(74) *Attorney, Agent, or Firm*—Mattingly, Stanger, Malur & Brundidge, P.C.

(57) ABSTRACT

The present invention allows a back-up site used for disaster recovery to be constructed in a shorter period of time.

In a disk array device 1 at a main site, a copy 4 of a RAID group 3 is generated. In-frame mirroring is used to generate this copy. The RAID group 4 is removed from the disk array device 1 by an operator and transported to a back-up site. The operator then installs each of the disks of the RAID group 4, respectively, in the disk array device 2, in such a manner that they adopt the same positions as in the RAID group 3. The configuration information 5 used in order to manage the RAID group 3 is downloaded to the disk array device 2 in the back-up site, by means of a portable storage medium 8, or via a communications network 7. Thereupon, the differential data between the disk array devices 1, 2 is reflected in the disk array device 2, whereupon construction of the back-up site is complete.

9 Claims, 9 Drawing Sheets

Fig. 5

CONFIGURATION INFORMATION

T1

| FIBRE PORT INFORMATION | | | | | |
|---|---|---|---|---|---|
| Port# | HOST MODE | ADDRESS | Fablic | Connection | CONNECTION LU |
| 1 A | O S a | E F | ON | Point to Point | LU0 |
| 1 B | O S b | E 8 | ON | Point to Point | LU1 |
| 1 C | O S c | E 4 | ON | Point to Point | LU2 |
| ⋮ | ⋮ | ⋮ | ⋮ | ⋮ | ⋮ |

T2

| RAID INFORMATION | | | | |
|---|---|---|---|---|
| RAID# | RAID CONFIGURATION | CAPACITY | LU CONFIGURATION | CAPACITY |
| RAID 0-1 | 3D+1P | 216GB | LU0 | 144GB |
| | | | LU1 | 72GB |
| RAID 0-2 | 2D+2P | 144GB | LU2 | 144GB |
| ⋮ | ⋮ | ⋮ | ⋮ | ⋮ |

Fig. 6

| DIFFERENTIAL BIT MAP | | | T3 |
|---|---|---|---|
| RAID # | BLOCK # | UPDATE FLAG | |
| RAID 0-1 | BLOCK 1 | 0 | |
| RAID 0-2 | BLOCK 2 | 0 | |
| RAID 0-3 | BLOCK 3 | 1 | |
| ⋮ | ⋮ | ⋮ | |
| RAID 0-n | BLOCK P | 0 | |
| RAID 1-1 | BLOCK 1 | 0 | |
| RAID 1-2 | BLOCK 2 | 1 | |
| RAID 1-3 | BLOCK 3 | 1 | |
| ⋮ | ⋮ | ⋮ | |
| RAID 1-n | BLOCK Q | 0 | |
| ⋮ | ⋮ | ⋮ | |
| RAID m-n | BLOCK R | 0 | |

# METHOD FOR OPERATING STORAGE SYSTEM INCLUDING A MAIN SITE AND A BACKUP

CROSS-REFERENCE TO RELATED APPLICATIONS

This application relates to and claims priority from Japanese Patent Application No. 2004-76356 filed on Mar. 17, 2004, the entire disclosure of which is incorporated herein by reference.

BACKGROUND OF THE INVENTION

1. Field of the Invention

The present invention relates to a method for operating a storage system comprising a main site and a back-up site.

2. Description of the Related Art

A storage system provides large-capacity and high-performance storage services to a host computer (business server, and the like). In a storage system, for example, a storage region is constituted on the basis of a RAID (Redundant Array of Independent Inexpensive Disks), formed by providing a plurality of disk drives in an array configuration. Logical volumes (LU: Logical Units), which are logical storage regions, are formed in the physical storage regions provided by the respective disk drives. A host computer is able to read and write data from and to these logical volumes.

The storage system stores and manages a large volume of data groups of various types which are used in a variety of organizations, such as businesses, autonomous bodies, universities, and the like, for example. In many cases, these data groups are absolutely indispensable to the activities of the organization. Therefore, various countermeasures are adopted in a multi-layered fashion in the storage system, in order to prevent the loss of important data groups, or situations where data groups become unusable.

For example, redundancy is created in the physical configuration and logical configuration of the storage system, by adopting an alternative path structure or a RAID structure, or the like, in order to prepare for the occurrence of faults, or the like. Furthermore, in a storage system, it is possible to back up the storage contents of the logical volumes, to a back-up device, such as a tape device, or the like, at regular or irregular intervals.

Furthermore, in a storage system, in order to prepare against large-scale disasters, such as earthquakes, or the like, for example, a back-up site can be situated in a location that is distant from the main site, in what is known as a "disaster recovery" system. Disk array devices for backing up data are located in this back-up site, and the storage contents thereof are synchronized with those of the disk array devices in the main site.

Remote copy technology is used in order to synchronize the storage contents in the main site and the back-up site. In a remote copy system, the respective disk array devices are mutually connected by means of a dedicated communications circuit or a public circuit, and the data is copied directly between the respective disk array devices, without passing via a host computer (see Japanese Patent Laid-open No. 2002-7304).

Furthermore, for example, a method is also known whereby the storage contents of the disk array device in the main site are backed up to magnetic tape, which is taken to the back-up site, and then restored onto the disk array device of the back-up site.

Moreover, technology is also known whereby disk drives are replaced in a frame, or moved to a different frame (Japanese Patent Laid-open No. 2001-337792).

When the storage contents of the main site are to be copied to a back-up site, firstly, an initial copy is made (establish copy), and the storage contents of the main site at a particular point in time are copied exactly to the back-up site. Thereupon, the data updated in the main site is transferred to the back-up site, as differential data, and is copied to a storage region of the back-up site.

In a method wherein the initial copy is carried out via a communications circuit, although the situation may vary depending on the bandwidth and speed of the communications circuit, and the volume of the data to be copied, and the like, in general, a long time is required in order to make the initial copy. Therefore, it takes time for the back-up site to start up. Furthermore, if the communications circuit is occupied for the purposes of making the initial copy, then this may affect other types of data communications using the same communications circuit.

In a method whereby the data at the main site is backed up onto magnetic tape and then taken to the back-up site, no communications circuit is required. However, in general, the data write speed and data read out speed of a tape device is slower than that of other storage devices, and hence a long time is required in order to start up the back-up site. Since magnetic tape, which has a slow access speed, is used for both writing the data from the main site and reading out data into the back-up site, then it takes time to construct the back-up site. Furthermore, the magnetic tape device used for back-up is a control device that is completely independent from the disk array device. Consequently, if data back up based on the use of magnetic tape is to be adopted, then a magnetic tape device must be purchased.

In the reference patents described above, a method is disclosed wherein disk drives are moved to different frames. However, this reference patent simply discloses a method for moving an original disk drive to another frame, and it does not consider the construction of a back-up site for the purpose of disaster recovery.

SUMMARY OF THE INVENTION

The present invention was devised with the foregoing in view, one object thereof being to provide a method for operating a storage system whereby a back-up site can be constructed rapidly. A further object of the present invention is to provide a method of operating a storage system whereby a back-up site can be constructed rapidly, without halting the operation of a main site. A further object of the present invention is to provide a method of operating a storage system whereby a back-up site can be started up rapidly, without using special external functions. Other objects of the present invention will become apparent from the following description of the embodiments.

BRIEF DESCRIPTION OF THE DRAWINGS

FIG. 5 is an illustrative diagram showing one example of configuration information;

FIG. 6 is an illustrative diagram showing one example of information for managing differential data;

DESCRIPTION OF THE PREFERRED EMBODIMENTS

Figure 1:
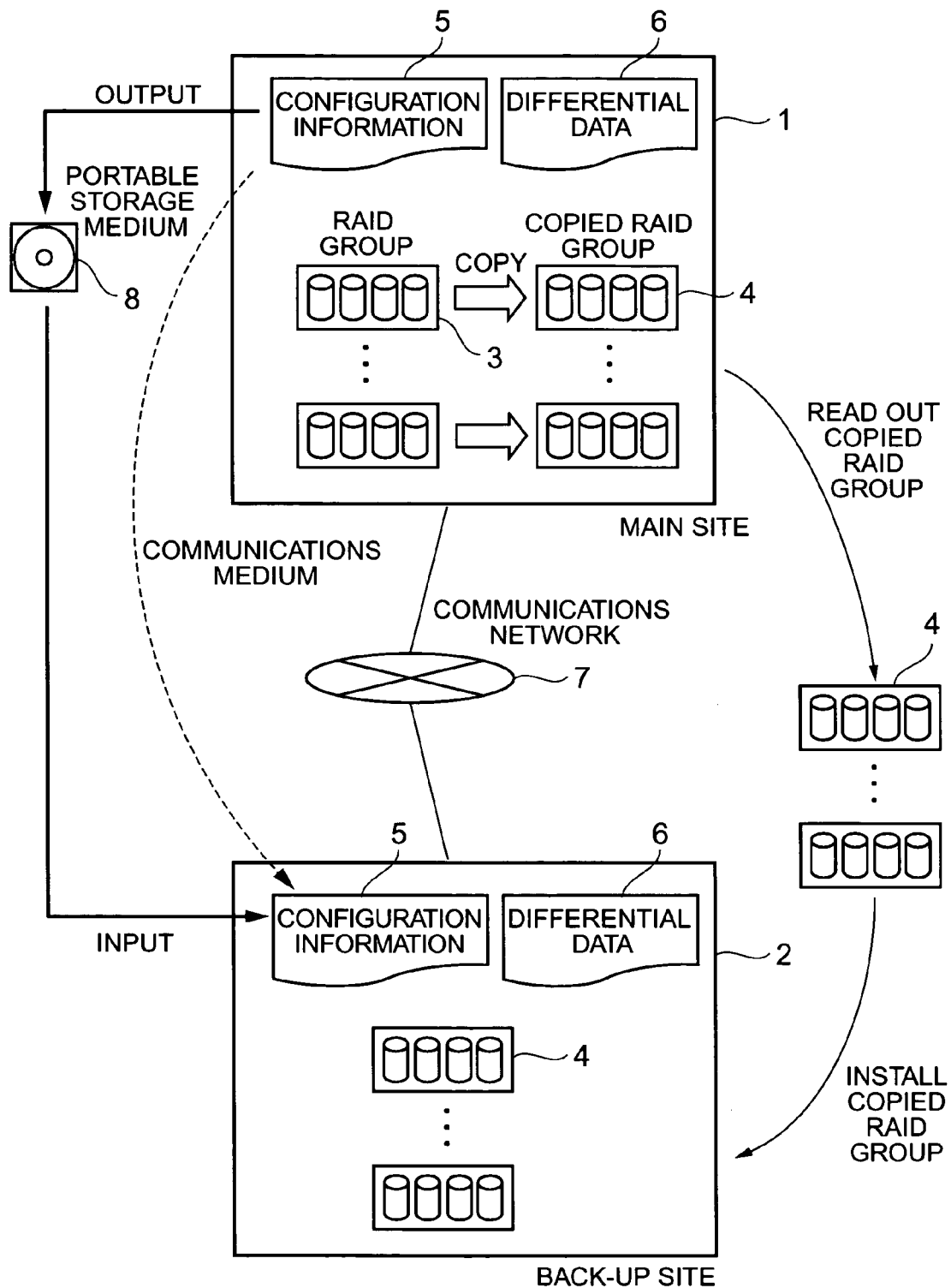
FIG. 1 is an illustrative diagram showing an overview of the present invention.

In order to achieve the aforementioned object, the method for operating a storage system according to the present invention is a method for operating a storage system in which a disk array device provided in a main site and a disk array device provided in a back-up site are connected by means of a communications network; the disk array device in the main site and the disk array device in the back-up site respectively comprising: a channel adapter for controlling transmission and reception of data to and from a host device, a disk adapter for controlling data transmission and reception to and from a disk, and a memory shared by the channel adapters and the disk adapters; the operating method comprising: a first step of generating a copy disk of a prescribed disk provided in the disk array device of the main site, within the disk array device of the main site, by means of the disk adapter of the disk array device in the main site; a second step of removing the copy disk from the disk array device in the main site and installing same in a prescribed position of the disk array device in the back-up site; and a third step of storing configuration information relating to the prescribed disk held in the disk array device of the main site, in the memory of the disk array device of the back-up site.

Here, the disk array devices of the main site and the disk array devices of the back-up site can be constructed in such a manner that they have essentially the same structure. Each disk array device is constituted by a channel adapter for controlling transmission and reception of data to and from a host device, a disk adapter for controlling transmission and reception of data to and from a disk, and a memory (cache memory and/or control memory) which is shared by the channel adapter and disk adapter. The respective disk array devices are mutually connected by means of a communications circuit, such as a SAN (Storage Area Network), WAN (Wide Area Network), the Internet, or the like, for example. The first to third steps described above can be carried out respectively while the disk array devices of the main site are in an operational state.

In the first step, a prescribed disk of a disk array device of the main site is copied, thereby generating a copy disk. The copy disk is generated inside the disk array device of the main site. In general, the copy object is a data disk. Possible methods for generating a copy disk in a disk array device of the main site include, for example, a method whereby a copy is generated inside the disk array device of the main site (in-frame mirroring), and a method whereby a copy is generated between a first and a second disk array device provided in the main site (frame to frame mirroring in same site). Either of these methods may be used.

For example, it is possible to generate a copy disk by means of a disk adapter reading out data from a prescribed disk that is to be copied, to a memory (the cache memory), and then writing the data read out to this memory to a copy destination disk.

In the second step, the operator extracts the copy disk from the disk array device of the main site, and takes it to the back-up site. Thereupon, an operator (which does not have to be the same operator) installs the copy disk in a prescribed position of a disk array device in the back-up site. The copy disk can be installed in the same installation position as the installation position of the original prescribed disk.

In the third step, the configuration information relating to the prescribed disk is stored in the disk array device of the back-up site. Thereby, the disk array device of the back-up site recognizes that a copy disk has been installed therein, and it is able to use this copy disk as if it were the original prescribed disk. By installing a copy disk copied from a prescribed disk, in the same installation position as the prescribed disk, it is possible to use the configuration information relating to the prescribed disk, in a substantially unaltered form. Therefore, the disk array device of the back-up site is not required to carry out re-recognition tasks relating to the disk, such as identifying which disk has been installed where, and which disks belong to the same RAID group, for example.

The configuration information can be stored in the disk array device of the back-up site by means of a variety of methods. The first method is a method whereby the information is stored onto a storage medium, which may be of various kinds, such as a flash memory, or a flexible memory, for example, and the medium is then incorporated into the back-up site, either together with the copy disk, or by a separate route from the copy disk. In a second method, the configuration information is input to the disk array device of the back-up site by means of a communications network which connects the main site and the back-up site. In a third method, the configuration information is stored in a prescribed empty region of the copy disk, and when the copy disk is installed in the disk array device of the back-up site, the configuration information is read out from that prescribed region. Any of these methods may be adopted. Moreover, if a storage medium that is separate from the copy disk is used, then it is possible to carry out data transfer between the storage medium and the disk array device, by means of a wired or wireless method.

Below, embodiments of the present invention are described with respect to the drawings. FIG. 1 is a conceptual diagram of the present embodiment. The main site and back-up site are situated in physically separate locations. The disk array device 1 at the main site provides storage services to a host computer situated outside the range of the drawing. x If the function of the disk array device 1 in the main site is halted, then the disk array device 2 in the back-up site provides storage services, in a continuous fashion, to the host computer. Therefore, as well as providing the same functions respectively in the disk array device 1 in the main site and the disk array device 2 in the back-up site, it is also necessary that the respective storage contents in either device are matching.

A plurality of back-up sites may be provided. If a new back-up site is provided, then a prescribed RAID group 3 of the disk array device 1 in the main site is copied, to generate a RAID group 4. The RAID group 3 is a collection of data disks which respectively store data. In other words, the group of data disks storing data to be backed up is copied to a respective group of disks in the disk array device 1.

If the copy destination RAID group 4 for the desired RAID group 3 is generated, then the access to the copy destination RAID group 4 is halted and shut off processing is carried out for each of the disks constituting the copy destination RAID group 4. The operator then extracts the respective disks of the copy destination RAID group 4, from the disk array device 1.

After the access to the copy destination RAID group 4 has been halted, the host computer (outside the diagram) accesses the disk array device 1 and updates the data in the RAID group 3. When the RAID group 3 is newly updated, this update data is managed as differential data 6.

The operator conveys the copy destination RAID group 4 from the main site to the back-up site, and installs it in the disk array device 2 of the back-up site. In this case, the operator installs each of the disks of the copy destination RAID group 4, respectively, in the same installation positions as the installation positions of the respective disks of the original RAID group 3. The disks constituting the copy destination RAID group 4 are respectively installed at installation positions corresponding to the installation positions of the respective disks constituting the RAID group 3, including their individual positions within the RAID group.

The operator copies the configuration information 5 held in the disk array device 1 of the main site, to the disk array device 1 of the back-up site, by means of a portable storage medium 8, or via a communications medium. This configuration information 5 is configuration information relating to the RAID group 3, in other words, information that is required when the copy destination RAID group 4 is used in the back-up site.

For example, the operator stores the configuration information 5 in the portable storage medium 8 and then conveys it, together with the copy destination RAID group 4, to the back-up site. The operator when connects the portable storage medium 8 to the interface of the disk array device 2, and causes this configuration information 5 to be read into the disk array device 1. Alternatively, the configuration information of the disk array device 1 can be transmitted to the disk array device 2, via the communications network 7.

By storing the configuration information 5 in the disk array device 2 of the back-up site, the disk array device 2 becomes able to use the copy destination RAID group 4 as back up for the original RAID group 3.

Thereupon, differential data 6 is sent from the disk array device 1 in the main site to the disk array device 2 in the back-up site. The disk array device 2 causes this differential data to be reflected in the respective disks. In this manner, the RAID group 3 in the main site and the RAID group 4 in the back-up site are synchronized.

1. First Embodiment

Figure 2:
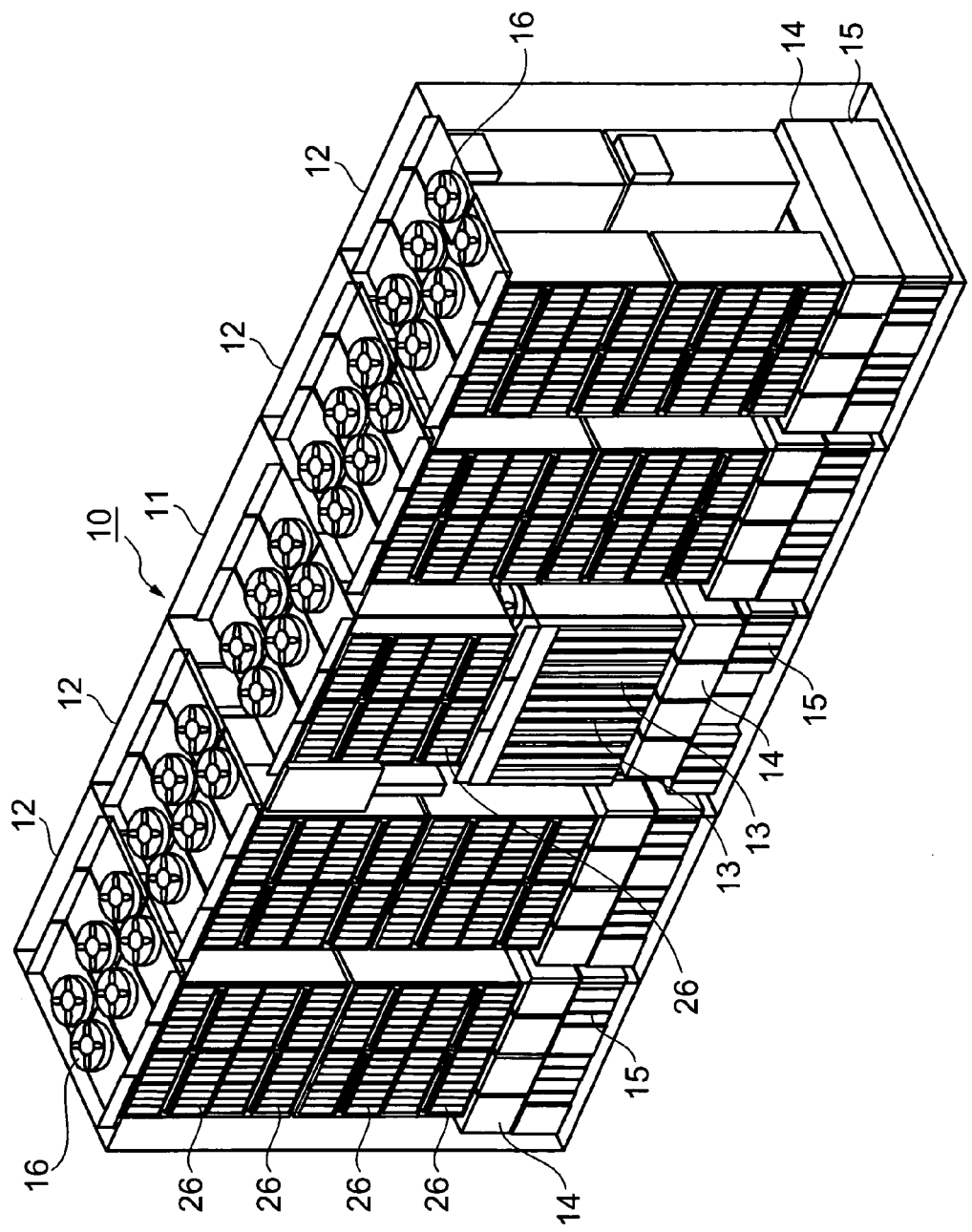
FIG. 2 is an external view of a disk array device relating to an embodiment of the present invention.

FIG. 2 is a general oblique view showing the external configuration of a disk array device 10. The disk array device 10 may be constituted, for example, by a base frame 11 and a plurality of add-on frames 12.

The base frame 11 is the smallest configuration unit of the disk array device 10, and it is provided with both storage functions and control functions. The add-on frames 12 are optional items of the disk array device 10, and are controlled by means of the control functions provided in the base frame 11. For example, it is possible to connect a maximum of four add-on frames 12 to the base frame 11.

The base frame 11 comprises a plurality of control packages 13, a plurality of power supply units 14, a plurality of battery units 15, and a plurality of disk drives 26, provided respectively in a detachable fashion. A plurality of disk drives 26, a plurality of power supply units 14 and a plurality of battery units 15 are provided detachably in the add-on frames 12. Moreover, a plurality of cooling fans 16 are also provided respectively in the base frame 11 and the respective add-on frames 12.

The control packages 13 are modules for respectively realizing the channel adapters (hereinafter, CHA) 21, disk adapters (hereinafter, DKA) 22 and cache memory 23, and the like, described hereinafter. More specifically, a plurality of CHA packages, a plurality of DKA packages, and one or more memory package are provided in a detachable fashion in the base frame 11, in such a manner that they can be exchanged in package units.

Figure 3:
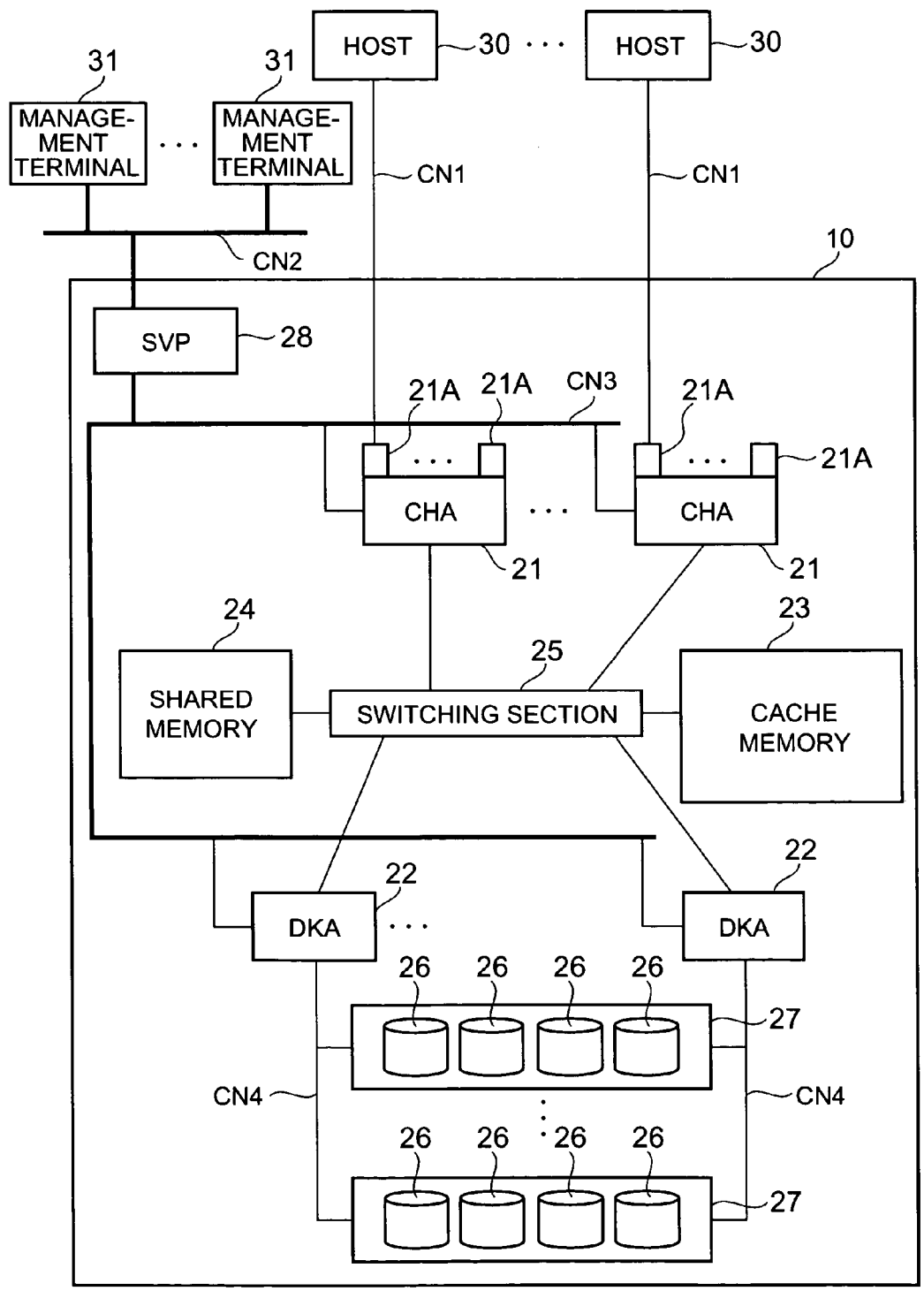
FIG. 3 is a block diagram showing a general overview of a disk array device.

FIG. 3 is a block diagram showing a general overview of a disk array device 10. The disk array device 10 can be connected respectively to a plurality of host computers 30, in a two-way communicable fashion, via a communications network CN1.

The communications network CN1 is, for example, a LAN, a SAN (Storage Area Network), the Internet, or a dedicated circuit, or the like. If a LAN is used, then the data transfer between the host computer 30 and the disk array device 10 is conducted in accordance with a TCP/IP protocol. If a SAN is used, data transfer is conducted between the host computer 30 and the disk array device 10 in accordance with a fiber channel protocol. Furthermore, if the host computer 30 is a mainframe computer, then data transfer is conducted in accordance with a communications protocol, such as FICON (Fibre Connection: registered trademark), ESCON (Enterprise System Connection: registered trademark), ACONARC (Advanced Connection Architecture: registered trademark), FIBARC (Fibre Connection Architecture: registered trademark), or the like.

Each of the host computers 30 is constituted, for example, by a server, personal computer, workstation, mainframe computer, or the like. For example, the respective host computers 30 are connected via a separate communications network to a plurality of client terminals, which are situated outside the range of the drawing. The respective host computers 30 provide services to the respective client terminals, by reading or writing data, from or to the disk array device 10, in response to requests from the respective client terminals, for example.

Each of the CHAs 21 controls data transfer with the respective host computers 30, and is provided with a communications port 21A. Thirty-two CHAs 21, for example, can be provided in the disk array device 10. A CHA 21 is prepared, for example, in accordance with the type of host computer 30, such as an open CHA, a main frame CHA, or the like, for example.

Each CHA 21 receives commands and data requesting data read out, or writing, from the host computer 30 connected respectively thereto, and operates in accordance with the commands received from the host computer 30.

To describe the operation of the CHA 21 and that of the DKA 22, in advance, when the CHA 21 receives a read command from the host computer 30, this read command is stored in the shared memory 24. The DKA 22 refers to the shared memory 24 occasionally, and if it discovers an unprocessed read command, then it reads out the data from the disk drive 26, and stores this data in the cache memory 23. The CHA 21 reads out the data transferred to the cache memory 23, and then transmits the data to the host computer 30.

On the other hand, if the CHA 21 receives a write command from the host computer 30, then it stores this write command in the shared memory 24. Moreover, the CHA 21 stores the received data (user data) to the cache memory 23. The CHA 21 stores the data in the cache memory 23, and then reports completion of writing to the host computer 30. The DKA 22 reads out the data stored in the cache memory 23, in accordance with the write command stored in the shared memory 24, and stores this data in the prescribed disk drive 26.

Each of the DKAs 22 may be provided in a plural fashion, for instance, comprising 4 or 8 adapters, in the disk array device 10. Each DKA 22 respectively controls data communications with a particular disk drive 26. The respective DKAs 22 and the respective and the respective disk drives 26 are connected by means of a communications network CN4, such as a SAN, for example, and perform data transfer in block units, in accordance with a fibre channel protocol. Each DKA 22 monitors the state of the corresponding disk drive 26 occasionally, and the result of this monitoring operation is transmitted via the internal network CN3, to the SVP 28.

The respective CHAs 21 and the respective DKAs 22 are provided respectively with a printed circuit board on which a processor, memory, and the like, are mounted, and a control program stored in the memory, for example, (neither of these elements being depicted in the drawings), and they respectively achieve prescribed functions by means of combined operation of these hardware and software elements.

The cache memory 23 stores user data, and the like, for example. The cache memory 23 is constituted by a non-volatile memory, for example. If the RAID group is copied, then the data in the copy destination RAID group is, for example, read out temporarily to the cache memory 23, and it is then written from cache memory 23 to the copy destination RAID group.

The shared memory (or the control memory) 24 is constituted by a non-volatile memory, for example. Control information, management information, and the like, is stored in the shared memory 24, for example. It is also possible for the configuration information T1, T2, and the like, described hereinafter, to be managed by means of the shared memory 24. Information, such as this control information, and the like, can be managed in a multi-layered fashion by means of a plurality of shared memories 24. The shared memory 24 and cache memory 23 may respectively be provided in a plural fashion. Furthermore, it is also possible to provide both a cache memory 23 and a shared memory 24 on the same memory board. Alternatively, one portion of the memory may be used as a cache region and another portion thereof may be used as a control region.

The switching section 25 respectively connects together the respective CHAs 21, the respective DKAs 22, the cache memory 23 and the shared memory 24. Thereby, all of the CHAs 21 and the DKAs 22 may respectively access the cache memory 23 and the shared memory 24. The switching section 25 may be constituted as an ultra-high-speed crossbar switch, or the like, for example.

A plurality of disk drives 26 may be installed in the disk array device 10. Each of the disk drives 26 can be realized in the form of a hard disk drive (HDD), a semiconductor memory device, or the like, for example.

A disk drive 26 is a physical storage device. Although the situation varies depending on the RAID configuration, or the like, a RAID group 27 which is a virtual logical region is constructed on a physical storage region provided by one group of four disk drives 26, for example. Moreover, one or more virtual logical devices (LU: Logical Unit) can be established in a RAID group 27.

The storage resources used by the disk array device 10 do not all have to be provided inside the disk array device 10. The disk array device 10 is able to incorporate and use storage resources existing externally to the disk array device 10, exactly as if there were its own storage resources.

The service processor (SVP) 28 is connected respective to each of the CHAs 21 and the DKAs 22, by means of an internal network CN3, such as a LAN. Furthermore, the SVP 28 may be connected to a plurality of management terminals 31, by means of a communications network CN2, such as a LAN. The SVP 28 accumulates the respective states inside the disk array device 10, and provides this information to the management terminal 31.

Figure 4:
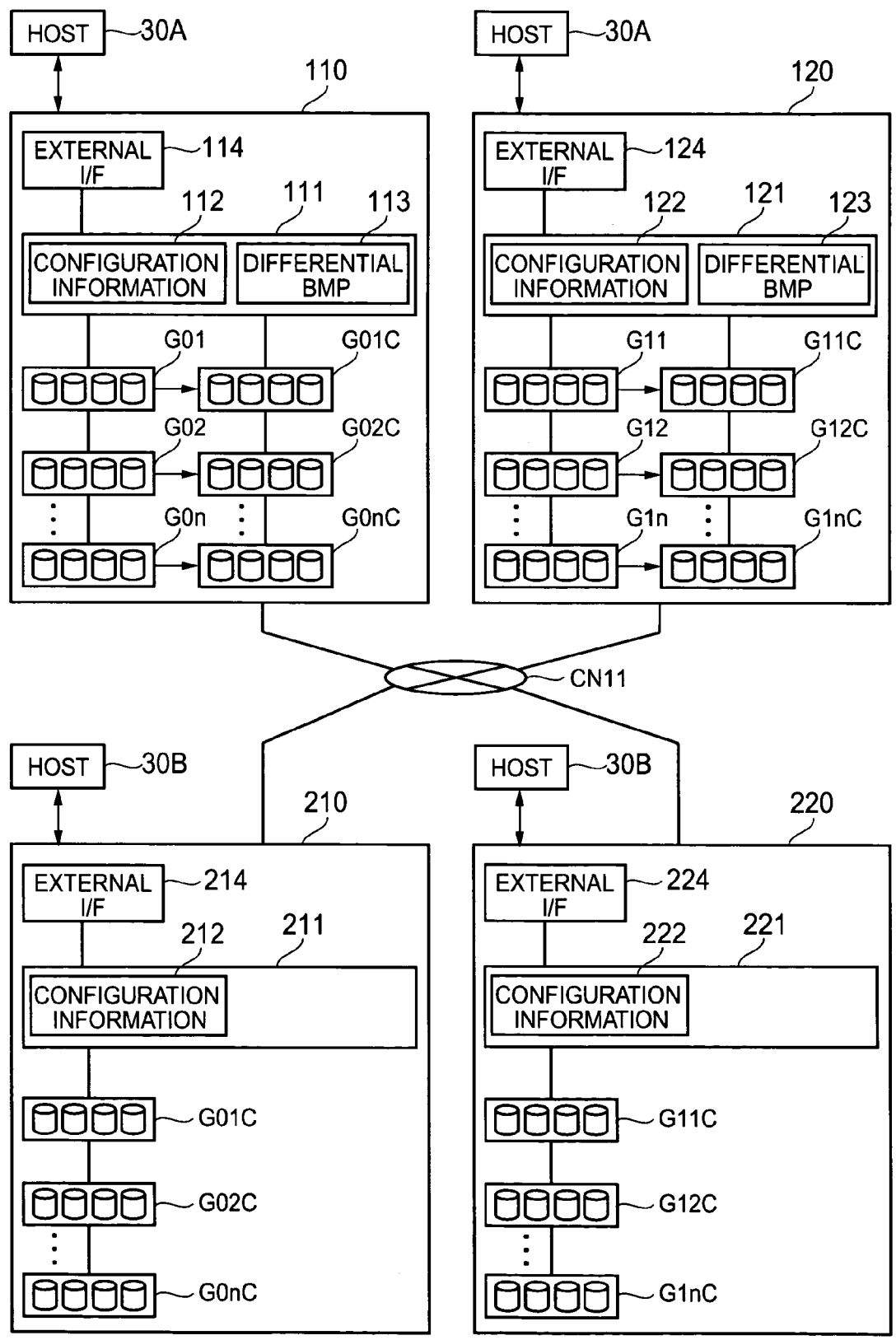
FIG. 4 is a block diagram showing the general configuration of a storage system.

FIG. 4 is a block diagram showing the general configuration of a storage system according to the present embodiment. In the present embodiment, as described hereinafter, a copy RAID group is generated by using in-frame mirroring technology.

The storage system comprises a main site and a back-up site. A plurality of disk array devices 110, 120 are respectively provided in the main site which is depicted on the upper side of the FIG. 4. A plurality of disk array devices 210, 220 are respectively provided in the back-up site which is depicted on the lower side of the FIG. 4. The respective disk array devices 110, 120 of the main site and the respective disk array devices 210, 220 of the back-up site are mutually connected by means of a communications network CN11, such as a SAN, WAN, or the like, for example.

Furthermore, the respective disk array devices 110, 120 of the main site can be accessed respectively by a main host computer 30A. Furthermore, the respective disk array devices 210, 220 of the back-up site can be accessed respectively by a secondary host computer 30B. Where there is no need to distinguish between the two, the host computer is simply called "host computer 30".

The host computer 30A which accesses the main site and the host computer 30B which accesses the back-up site may be the same computer or they may be separate computers. However, if they are separate computers, then desirably, both the host computer 30A and the host computer 30B should respectively have the same hardware configuration and software configuration.

For example, a host computer 30B of the same configuration as the host computer 30A is prepared when the back-up site is constructed. If there is a change in the configuration of the host computer 30A, then this configuration change is reflected in the host computer 30B. In the most desirable operation, if a RAID group G0C is generated and moved to a back-up site, then a full back-up is carried out for the host computer 30A, and all of the data in the host computer 30A is reflected in the host computer 30B.

The respective disk array devices 110, 120, 210, 220 are respectively constituted as devices having the same structure. Each of the disk array devices 110, 120, 210, 220 may be constituted in the manner of the disk array device 10 described in conjunction with FIG. 2 and FIG. 3.

Configuration information 112 and a differential bit map table (in the diagram, "differential BMP") 113 for managing the differential data are stored in the controller 111 of the first disk array device 110 of the main site. Information relating to the configuration of the RAID group G0 that is to be copied is stored in the configuration information 112. The configuration information 112 and a differential bit map table 113 are described further hereinafter. According to the examples described above, the controller 111 can be constituted by means of the respective CHAs 21 and DKAs 22, and the cache memory 23 and the shared memory 24.

An external interface (hereinafter, external I/F) 114 is connected to the controller 111. The external I/F 114 serves for inputting and outputting information to and from an external device, and it is used in order to output the configuration information 112 to a portable storage media 8 and the communications network CN11. If configuration information 112 is output to the portable storage medium 8, then in terms of the example shown in FIG. 3, it is possible to use the I/F provided in the management terminal 31 as an external I/F 114. If configuration information 112 is output to the communications network CN11, then in terms of the example shown in FIG. 3, it is possible to use the communications I/F of the CHA 21 as an external I/F 114.

The disk array device 110 can be provided with a plurality of RAID groups. For the sake of simplicity, two RAID groups G0, G0C are illustrated. One of the RAID groups G0 is constituted by a plurality of RAID groups G01 to G0n, and it stores data used by the host computer 30. Each of the RAID groups G0 to G0n is respectively constituted by four physical disk drives, for example. Similarly, the other RAID group G0C is constituted by a plurality of RAID groups G01C to G0nC, and each of these RAID groups G01C to G0nC is respectively constituted by four physical disk drives, for example.

The RAID group G0 is able to call the original RAID group or the copy destination RAID group. The other RAID group G0C is able to call the copy RAID group or the copy destination RAID group.

The other RAID group G0C is prepared in order to generate a copy of the first RAID group G0. Therefore, the drive configuration and the RAID configuration of the RAID groups G0 and G0C are the same. The RAID group G0 and the other RAID group G0C form a copy pair. By so-called in-frame mirroring, it is possible to synchronize the storage contents of the first RAID group G0 and the storage contents of the other RAID group G0C.

The other disk array device 120 provided in the main site is also provided with a similar configuration to the disk array device 110 described above. In other words, the disk array device 120 comprises a controller 121 and a plurality of RAID groups G1, G1C. The controller 121 stores configuration information 122 and a differential bitmap table 123. Furthermore, the controller 121 is connected to an external I/F 124.

The first RAID group G1 of the disk array device 120 stores data used by the host computer 30A. The other RAID group G1C constitutes a copy destination for the RAID group G1.

The configuration of the back-up site is not described. A plurality of disk array devices 210, 220 are provided in the back-up site. The disk array device 210 corresponds to the disk array device 110 of the main site. The other disk array device 220 corresponds to the disk array device 120 of the main site.

The disk array device 210 comprises a controller 211. The controller 211 stores configuration information 212. This configuration information 212 is stored by copying the configuration information 112 stored in the disk array device 110 in the main site, to the disk array device 210. Therefore, the configuration information 212 and the configuration information 112 have the same contents. Furthermore, the controller 211 is connected to an external I/F 214. This external I/F 214 inputs configuration information 112 from the disk array device 110 in the main site. As described above, a portable storage medium 8 or a communications medium (CN11) may be used as the method for inputting this information.

The disk array device 210 comprises a RAID group G0C. This RAID group G0C is transferred from the disk array device 110 of the main site. The RAID group G0C extracted from the disk array device 110 is conveyed to the back-up site, by the operator, and installed in the disk array device 210.

Here, in the case of installation, the respective disks belonging to the respective RAID groups forming the RAID group G0C are installed in the same installation positions as the installation positions of the disks corresponding to the original RAID group G0. If a different disk has already been installed in the installation position, then that disk may be stored in the back-up site, as a spare disk. Alternatively, the spare disk may be conveyed to the main site, and installed in an empty position created by removing a copy disk.

The other disk array device 220 provided in the back-up site corresponds to the disk array device 120 of the main site. The disk array device 220 also has a similar configuration to the disk array device 210. The controller 221 stores configuration information 222. This configuration information 222 is obtained by copying the configuration information 122 in the corresponding disk array device 120. Furthermore, the controller 221 is provided with an external I/F 224.

The disk array device 220 comprises a RAID group G1C. This RAID group G1C is one that has been transferred from the corresponding disk array device 120 of the main site. In this transfer also, each disk belonging to the RAID group G1C is installed in the same position as the installation position of the respective disks belonging to the RAID group G1 in the main site.

FIG. 5 is an illustrative diagram showing one example of configuration information 112, 122 (212, 222). The configuration information may comprise, for example, fiber port information T1 and RAID information T2.

In the fiber port information T1, each port number (port #) of the disk array device is associated with information assigned to that port. The port information may include, for example, the type of OS (Operating System) used in the host computer 30 connected to that port, the address (IP address) or WWN (World Wide Name) assigned to that port, the type of communications mode at that port, the number of the logical volume connected to that port, and the like.

The RAID information T2 may include, for example, for each RAID group number, the RAID configuration of the RAID group, the storage capacity provided by that RAID group, and the logical volume number and allocated data volume, and the like, established for that RAID group.

This configuration information is copied to the disk array devices 210, 220 in the back-up site. Thereby, the RAID groups G0C and G1C transferred from the disk array devices 110, 120 of the main site to the disk array devices 210, 220 of the back-up site can be used in a similar manner to the original RAID groups G0, G1.

FIG. 6 is an illustrative diagram showing one example of differential bitmap tables 113, 123. The differential bitmap table T3 shown in FIG. 6 corresponds respectively to the differential bitmap tables 113, 123 shown in FIG. 4.

The differential bitmap table T3 associates update flags with the block addresses belonging to the respective RAID groups, for each RAID group number, for example. The storage region of each RAID group is divided into blocks of uniform size, starting from the header, and a one-bit update flag is allocated to each of these blocks.

If data belonging to any of the blocks has been updated in response to an update request from the host computer 30, then the update flag for that block is set to "1". If the update flag is set to "0", then this indicates that the data belonging to this block has not been updated, in other words, it indicates that it has not been changed. In an initial state when differential management is started, all of the update flags are set to "0". As described below, if a write process is generated by the host computer 30, after the input/output processing (I/O) for the copy RAID groups G0C, G1C has been halted, then the update flag for the updated block is changed from "0" to "1".

By referring to the differential bitmap table T3, it is possible readily to tell what data belonging to which block of which RAID group has been changed. Therefore, only the data of the changed blocks is transmitted as differential data from the main site to the back-up site, and hence the storage contents of the respective sites can be synchronized, simply by reflecting this differential data in the disk in the back-up site.

Figure 7:
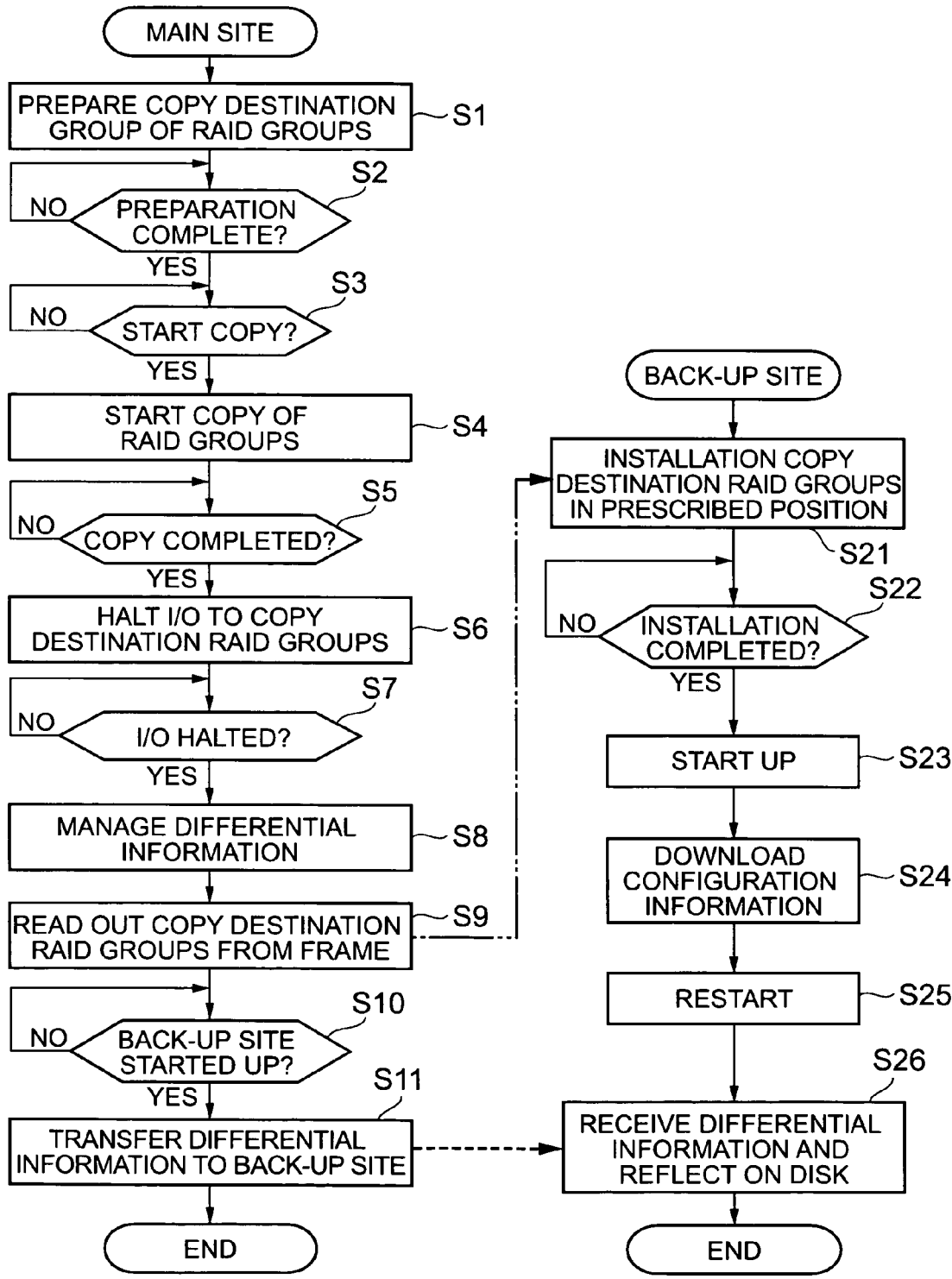
FIG. 7 is a flowchart showing the overview of processing for initial construction of a back-up site.

FIG. 7 is a flowchart showing processing for constructing a back-up site. This description focuses on the relationship between the disk array device 110 of the main site and the disk array device 210 of the back-up site, but similar processing is also carried out between the disk array device 120 and the disk array device 220.

Firstly, a copy destination RAID group G0C is prepared in order to copy the RAID group G0 corresponding to the primary volume (S1). Each of the RAID groups G0 and G0C is respectively constituted by a plurality of RAID groups. Furthermore, each of the corresponding RAID groups is constituted respectively by a similar number of disks. In the example illustrated, the RAID group G01 corresponds to the RAID group G01C, the RAID group G02 corresponds to the RAID group G02C, and the RAID group G0n corresponds to the RAID group G0nC.

If preparation of the RAID group G0C forming the copy destination has been completed (S1: YES), then data copying from the RAID group G0 to the RAID group G0C is executed, on the basis of an instruction from the host computer 30A (S3: YES). This data copying is carried out by the controller 111 (S4). More specifically, the controller 111 reads out data from the copy source RAID group, to a cache memory, and then causes the data to be copied from the cache memory to the copy destination RAID group. This operation is carried out for all of the copy source RAID groups G01–G0n.

Here, various method can be adopted for copying the data in the RAID group G0 to the RAID group G0C. For example, it is possible for the write processing from the host computer 30A to be carried out respectively to both the RAID group G0 and the RAID group G0C, in such a manner that the contents of both RAID groups G0, G0C are the same at all times. In this case, the data copy processing shown in FIG. 7 (Steps S3, S4, S5) is omitted. Furthermore, another method may be adopted wherein the contents of the respective RAID groups G0, G0C are made to coincide by means of an instruction from the operator, each time that the RAID group G0C is moved to the back-up site. FIG. 7 shows a case where the latter method is employed.

The completion of data copying from the RAID group G0 to the RAID group G0C is detected by the controller 111 and reported to the host computer 30A (S5: YES). Alternatively, a configuration can be adopted wherein a command containing a query about completion of copying is sent from the host computer 30A to the controller 111, whereupon the controller 111 confirms whether or not copying has been completed, and sends a corresponding response to the host computer 30A.

If the completion of copying has been confirmed, then the controller 111 halts the I/O processing to the copy destination RAID group G0C, on the basis of an instruction from the host computer 30A (S6). The completion of I/O halt processing to the RAID group G0C is detected by the controller 111 and reported to the host computer 30A (S7: YES). Alternatively, similarly to the foregoing, a configuration may be adopted whereby the controller 111 confirms the completion of I/O halting and sends a corresponding reply, in response to a query command from the host computer 30A.

Once the I/O processing to the RAID group G0C has been halted, the controller 111 starts differential management with respect to the write processing carried out in the original RAID group G0 by the host computer 30A (S8). More specifically, as described above, the controller 111 sets the update flag in the differential bitmap table T3 to "1", with respect to the data written to the RAID group G0. By this means, the differential between the original RAID group G0 and the copy destination RAID group G0C is managed.

Thereupon, shut off processing for the RAID group G0C is carried out. The operator then removes the RAID group G0C for which shut off processing has been completed, from the disk array device 110 (S9). Here, while data copy processing to the copy destination RAID group G0C and shut off processing are being carried out, the disk array device 110 is able to provide storage services, as normal, to the host computer 30A, by means of the original RAID group G0.

The RAID group G0C extracted from the disk array device 110 of the main site is placed in a case, or the like, by the operator, and then transported to the back-up site. The description now turns to the processing carried out on the back-up site side in FIG. 7. The RAID group G0C transported to the back-up site is installed in a prescribed position in the disk array device 210 (S21). More specifically, the respective disks constituting the copy destination RAID group G0C are installed in the same positions as the installation positions of the disks in the original RAID group G0, including the individual positions of each disk within the RAID group. When carrying out the task of installing the disks, the main power supply to the disk array device 210 is switched off.

If the installation of each of the disks has been completed (S22: YES), then the operator switches on the power supply to the disk array device 210 and starts up the disk array device 210 (S23). Thereupon, the operator causes the configuration information 112 of the disk array device 110 to be stored in the controller 211 of the disk array device 210 (S24). Thereby, the configuration information 212 is stored in the shared memory of the controller 211. The configuration information 112 of the main site and the configuration information 212 of the back-up site are the same, and both respectively contain information relating to the configuration of the original RAID group G0.

Once the configuration information 212 has been stored in the controller 211 of the back-up site, the disk array device 210 is started up again (S25). Thereby, the controller 211 recognizes the RAID group G0C, on the basis of the configuration information 212. The disk array device 210 assumes a usable state at this point.

At the main site, if it is detected that the disk array device 210 of the back-up site has been started up (S10: YES); then the differential data is transferred to the back-up site, on the basis of the differential bitmap table T3 (113) (S11).

When the disk array device 210 of the back-up site receives differential data from the disk array device 110 of the main site, this differential data is reflected in the RAID group G0C (S26). Thereby, the storage contents of the disk array device 110 and the disk array device 210 are synchronized.

Here, a variety of methods such as those described below may be used for downloading the configuration information 112 stored in the disk array device 110 of the main site to the disk array device 210 of the back-up site.

(1) Method Using Portable Storage Medium

In this method, the configuration information 112 stored in the controller 111 is transferred onto a portable storage medium, via the external I/F 114, and stored on this portable storage medium. The instruction for executing the copying of the configuration information can be issued by the host computer 30A and the management terminal 31, for example.

As a portable storage medium, it is possible to use, for example, a flash memory, an EEPROM (Electrically Erasable Programmable Read-Only Memory), an IC card, a memory card, or other such memory device. Alternatively, it is also possible to use a medium such as a magneto-optical disk (MO), a flexible disk (FD), a hard disk (HD), or the like.

The portable storage medium on which the configuration information 112 is stored is transported to the back-up site, either together with the copy destination RAID group G0C, or separately from the RAID group G0C. The configuration information stored in the portable storage medium is read into the controller 211, via the external I/F 214. Thereby, the configuration information 212 is held inside the controller 211.

(2) Method Using Communications Network

In this method, the configuration information 112 stored in the controller 111 is transmitted via a communications network CN11. Upon an instruction from the host computer 30A or the management terminal 31, the controller 111 appends prescribed header information to the configuration information 112 and sends it to the communications network CN 11, from the external I/F 114. This configuration information 112 is received by the controller 211 at the back-up site, from the communications network CN 11, via the external I/F 214.

Here, it is possible for the configuration information on the main site side to be transmitted to the back-up site side, at a variety of timings. For example, the configuration information 112 may be transmitted to the disk array device 210 in the back-up site after I/O processing to the RAID group G0C in the main site has halted. More specifically, it is possible to transmit the configuration information only, in advance, to the disk array device 210 and cause same to be stored therein, before the RAID group G0C is extracted from the disk array device 210 and transported to the back-up site. Alternatively, it is also possible for the configuration information to be transmitted from the disk array device 110 to the disk array device 210 after the RAID group G0C has been installed in the disk array device 210.

(3) Method Using RAID Groups

In this method, the configuration information relating to the RAID group G0 is held in the RAID group G0 itself, and the configuration information is copied at the same time, when the copy destination RAID group G0C is generated. Therefore, it is possible to read the configuration information into the controller 211, when the RAID group G0C has been installed in the disk array device 210 to which it is transferred.

The configuration information can be written, for example, to a management record in any one disk of the RAID groups constituting the RAID group G0, or to a plurality of disks. If there is a change in the configuration of the disk array device 110, then the configuration information is also updated. This configuration information stored on one disk or a plurality of disks is copied together with the application data, when the RAID group G0 is coped.

In FIG. 7, the description focused on the relationship between the disk array device 110 of the main site and the disk array device 210 of the back-up site, but similar processing to the foregoing is also carried out between the disk array device 120 and the disk array device 220.

By adopting the configuration described above, the present embodiment has the following beneficial effects. A configuration is achieved whereby copy destination RAID groups G0C and G1C for the RAID groups G0 and G1 are respectively generated in the disk array devices 110, 120 of the main site, the copied RAID groups G0C and G1C are transported to the back-up site and are installed respectively in prescribed positions of the corresponding disk array devices 210, 220, whereupon the configuration information 112, 122 is downloaded to the disk array devices 210, 220. Therefore, it is possible to construct a back-up site in a relatively short period of time, compared to a case where the large volume of data contained in the RAID groups G0 and G1 is transferred by means of a communications network CN11. Furthermore, it is possible to complete the initial construction of a back-up site in a shorter time, compared to a case where a back-up site is constructed using a back-up device, such as a tape device, or the like.

In the present embodiment, a configuration is adopted whereby the copy destination RAID groups G0C, G1C are generated by means of an in-frame mirroring function which causes data to be copied from one RAID group to another RAID group, within the same frame. Therefore, it is possible to perform the initial construction of a back-up site, without requiring special external devices or external functions, such as tape devices, back-up programs, or the like.

In the present embodiment, the data copy processing to the copy destination RAID groups G0C, G1C, the process of shutting off and removing the respective disks constituting the RAID groups G0C, G1C, and the processing for downloading the configuration information 112, 122 to the disk array devices 210, 220 of the back-up site can be carried out respectively, without having to halt the disk array devices 110, 120 in the main site. Therefore, the initial construction of the back-up site can be carried on without interrupting the supply of services by the main site.

Figure 8:
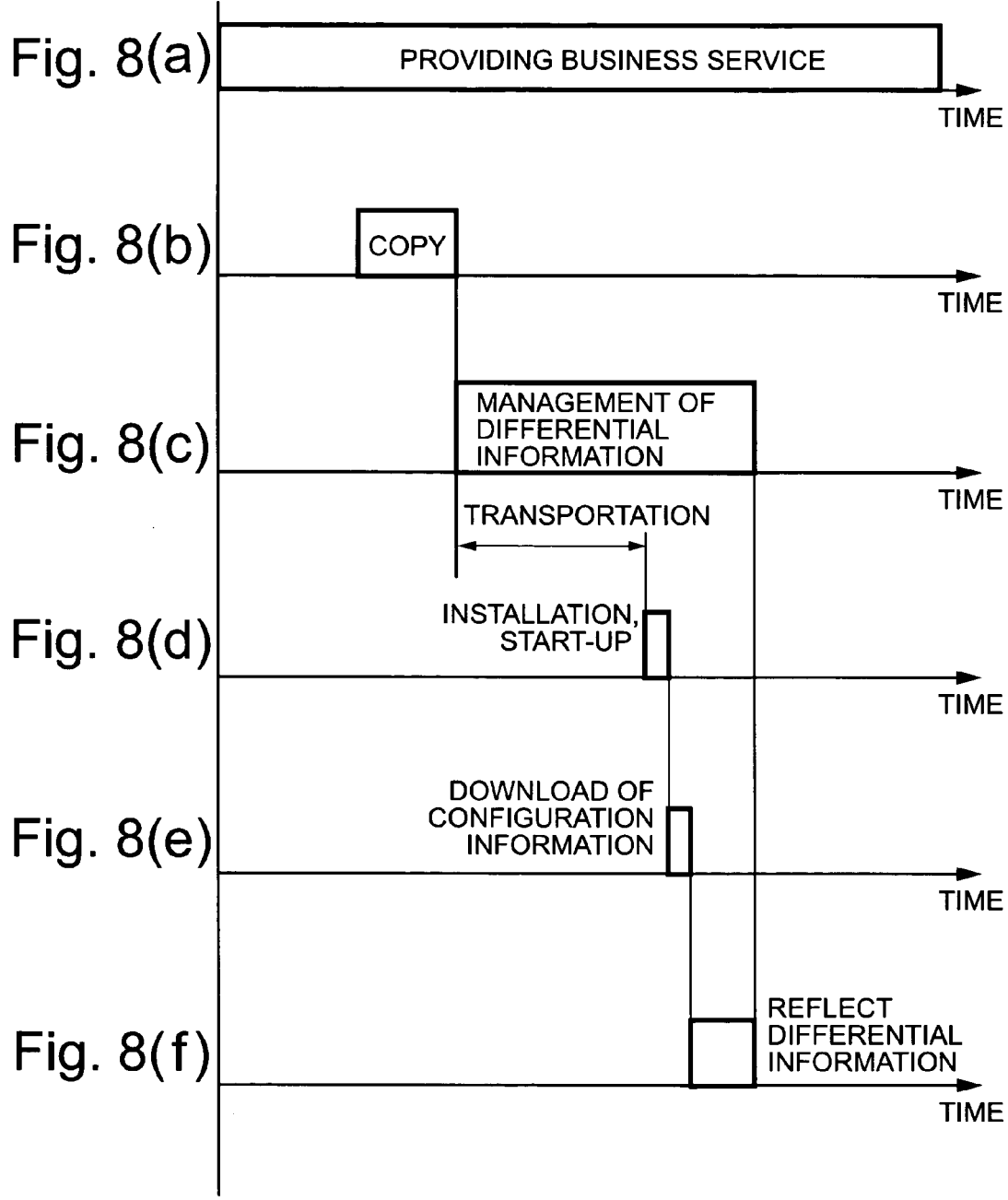
FIG. 8 is a timing chart of the initial construction of a back-up site.

FIG. 8 is a timing chart showing an approximate view of the respective processes according to the present embodiment. FIG. 8A shows a state where storage services are provided to a host computer 30A in the main site. FIG. 8B shows a state where respective copies of the RAID groups G0 and G1 are made.

As shown in FIG. 8C, when the copying of the RAID groups G0, G1 has been completed, the management of the differential data is started. When copying has been completed, the RAID groups G0C, G1C are respectively extracted from the disk array devices 110, 120 of the main site. As shown in FIG. 8D, the respective RAID groups G0C, G1C are transported to the back-up site, and are respectively installed in prescribed positions in the disk array devices 210, 220. As shown in FIG. 8E, when installation of the respective RAID groups G0C, CGC has been completed, the configuration information 112, 122 is downloaded to the disk array devices 210, 220. Thereby, the disk array devices 210, 220 are able to use the RAID groups G0C, G1C, similarly to the way in which the disk array devices 110, 120 use the RAID groups G0, G1.

Furthermore, as shown in FIG. 8F, the differential bitmap table T3 (113, 123) managed respectively by the disk array devices 110, 120 in the main site is reflected respectively in the corresponding disk array devices 210, 220. In this way, the same system is provided in both the disk array devices 110, 120 of the main site and the disk array devices 210, 220 of host terminal back-up site, and with this, the initial construction of the disaster recovery system is completed.

2. Second Embodiment

Figure 9:
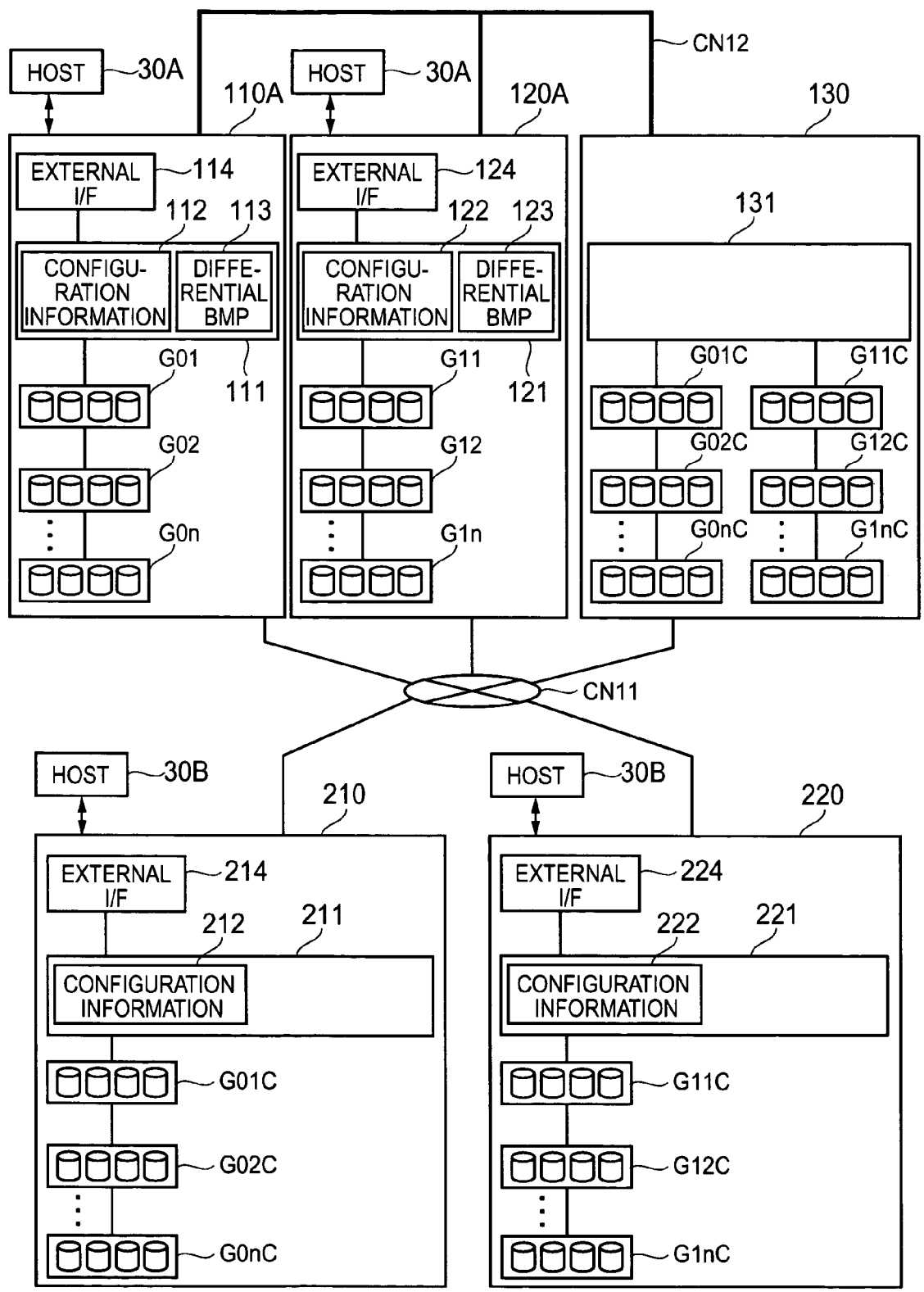
FIG. 9 is a block diagram showing the general configuration of a storage system according to a second embodiment.

FIG. 9 is a diagram of the overall configuration of a second embodiment of the present invention. The present embodiment can be taken to a modification example of the first embodiment. The characteristic feature of the present embodiment lies in the fact that copy destination RAID groups G0C, G1C are respectively generated by using frame-to-frame mirroring technology.

Three disk array devices 110A, 120A, 130 are provided respectively in the main site. Here, the disk array devices 110A, 120A correspond to a "first disk array device", and the disk array device 130 corresponds to a "second disk array device".

The respective disk array devices 110A, 120A, 130 are mutually connected by means of a high-speed communications network, such as a SAN, or the like, for example. Moreover, the main site and the back-up site are connected together by means of a communications network CN 11. Here, in general, the communications network CN 12 within the site operates at a higher speed than the communications network CN11 between sites. This is because it is difficult to construct a high-speed communications circuit for the site to site communications network CN11, due to network restrictions, circuit use charges, and other such problems.

The disk array device 110A comprises a RAID group G0, and the disk array device 120A comprises a RAID group G1. Copies G0C, G1C of these RAID groups G0, G1 are formed respectively in the disk array device 130. When a copy of the RAID groups G0, G1 is generated, data is transferred from the respective disk array devices 110A, 120A, to the disk array device 130, via the in-site communications network CN12. The process of making copies between separate device in this way is known as frame-to-frame mirroring.

A configuration can be adopted whereby the storage contents of the disk array devices 110A, 120A and the storage contents of the disk array device 130 are synchronized at all times, in such a manner that the data written to the RAID groups G0, G1 is also written simultaneously to the RAID groups G0C, G1C. Moreover, the configuration is not limited to this, and a configuration may also be adopted whereby copies of the RAID groups G0, G1 are generated in the disk device 130, on the basis of instructions from the host computer 30A, when the back-up site is constructed.

When the RAID groups G0C and G1C have been generated in the disk array device 130, the operator then switches off the main power supply to the disk array device 130 and removes the RAID groups G0C, G1C. The disk array device 130 is a device used for generating volume copies of the disk array devices 110, 120, and even if its function is halted, this does not affect the services provided by the disk array devices 110, 120.

The RAID groups G0C, G1C extracted from the disk array device 130 are conveyed to the back-up site, and installed respectively in prescribed positions in the disk array devices 210, 220. Similarly to the first embodiment, the configuration information 112, 122 is downloaded respectively to the controllers 211, 221 of the disk array devices 210, 220.

The differential bitmap tables T3 (113, 123) managed respectively by the disk array devices 110, 120 are transmitted to the disk array devices 210, 220, and respectively reflected on the disks of the disk array devices 210, 220.

By adopting the configuration described above, the present embodiment has the similar beneficial effects to those of the first embodiment. Furthermore, in the present embodiment, a configuration is adopted wherein a further disk array device 130 is used in order to generate copies of the RAID groups G0 and G1. Therefore, it is possible to remove the respective disks of the RAID groups G0 and G1, after switching off the main power supply to the disk array device 130, while the disk array devices 110 and 120 are still operating. Consequently, the disk removal operation can be carried out even more safely.

The present invention is not limited to the embodiments described above. It is possible for a person skilled in the art to make various additions, modifications, or the like, without departing from the scope of the present invention. For example, at each site, at least one or more disk array device should be provided, respectively, and therefore it is possible to apply the present invention to cases where three or more disk array devices are provided. Furthermore, if back-up sites are provided in a plurality of locations, then a number of copies of the RAID groups in the main site should be generated in accordance with the number of back-up sites. Alternatively, it is also possible to generate a RAID group at one back-up site for the purpose of constructing a further back-up site.

What is claimed is:

1. A method for operating a storage system in which a disk array device provided in a main site and a disk array device provided in a back-up site are connected by means of a communications network, wherein the disk array device in said main site and the disk array device in said back-up site respectively includes a channel adapter for controlling transmission and reception of data to and from a host device, a disk adapter for controlling data transmission and reception to and from a disk, and a memory shared by said channel adapter and said disk adapter; said operating method comprising:

a first step of generating a copy disk of a prescribed disk provided in the disk array device of said main site, within the disk array device of said main site, by the disk adapter of the disk array device in said main site;

a second step of removing said copy disk from said disk array device of said main site and installing said copy disk in a prescribed position of the disk array device of said back-up site; and a third step of storing configuration information, relating to said prescribed disk held in the disk array device of said main site, in the memory of the disk array device of said back-up site, wherein, in said second step, said copy disk is installed in the disk array device of said back-up site, in the same installation position as the installation position of said prescribed disk in the disk array device of said main site.

2. The method for operating a storage system according to claim 1 wherein, in said third step, said configuration information is stored in the disk array device of said back-up site, in a storage medium separate from said copy disk.

3. The method for operating a storage system according to claim 1 wherein, in said third step, said configuration information is stored in the disk array device of said back-up site by said communications network.

4. A method for operating a storage system in which a disk array device provided in a main site and a disk array device provided in a back-up site are connected by means of a communication network, wherein the disk array device in said main site and the disk array device in said back-up site respectively includes a channel adapter for controlling transmission and reception of data to and from a host device, a disk adapter for controlling data transmission and reception to and from a disk, and a memory shared by said channel adapter and said disk adapter, said method comprising;

a first step of generating a copy disk of a prescribed disk provided in the disk array device of said main site, within the disk array device of said main site, by the disk adapter of the disk array device in said main site;

a second step of removing said copy disk from said disk array device of said main site and installing said copy disk in a prescribed position of the disk array device of said back-up site;

a third step of storing configuration information, relating to said prescribed disk held in the disk array device of said main site, in the memory of the disk array device of said back-up site, and wherein, in said first step, said configuration information is stored on said copy disk, and wherein in said third step, said configuration information is read out from said copy disk and stored in the disk array device of said back-up site, when said copy disk is installed in the disk array device of said back-up site.

5. The method for operating a storage system according to claim 4, wherein said first, second and third steps are carried out respectively while the disk array device of said main site is in an operational state.

6. The method for operating a storage system according to claim 4, wherein in said first step, said copy disk is generated within the disk array device of said main site.

7. The method for operating a storage system according to claim 4, wherein a first disk array device, and a second disk array device synchronized with said first disk array device, are provided respectively in said main site, and wherein, in said first step, said copy disk is generated within said second disk array device.

8. The method for operating a storage system according to claim 4, wherein, in said third step, said configuration information is stored in the disk array device of said back-up site in a storage medium separate from said copy disk.

9. The method for operating a storage system according to claim 4, wherein, in said third step, said configuration information is stored in the disk array device of said back-up site by said communications network.

* * * * *